(12) United States Patent
Ogasahara

(10) Patent No.: US 9,143,762 B2
(45) Date of Patent: Sep. 22, 2015

(54) CAMERA MODULE AND IMAGE RECORDING METHOD

(75) Inventor: Takayuki Ogasahara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 484 days.

(21) Appl. No.: 13/049,455

(22) Filed: Mar. 16, 2011

(65) Prior Publication Data

US 2011/0292182 A1    Dec. 1, 2011

(30) Foreign Application Priority Data

May 27, 2010   (JP) ................................. 2010-121758

(51) Int. Cl.
*H04N 13/02* (2006.01)
*H04N 13/00* (2006.01)

(52) U.S. Cl.
CPC ....... *H04N 13/0239* (2013.01); *H04N 13/0022* (2013.01); *H04N 13/0296* (2013.01)

(58) Field of Classification Search
USPC ............................................ 348/47, E13.074
See application file for complete search history.

(56) References Cited

U.S. PATENT DOCUMENTS

| | | | | |
|---|---|---|---|---|
| 6,373,518 | B1 * | 4/2002 | Sogawa ........................... | 348/43 |
| 6,385,334 | B1 * | 5/2002 | Saneyoshi et al. ............. | 382/154 |
| 6,809,765 | B1 * | 10/2004 | Tao ................................ | 348/273 |
| 7,403,634 | B2 * | 7/2008 | Nishiura ........................ | 382/103 |
| 7,479,982 | B2 * | 1/2009 | Otani et al. ................... | 348/188 |
| 2003/0210343 | A1 * | 11/2003 | Okada ............................ | 348/345 |
| 2006/0115177 | A1 * | 6/2006 | Ishiga ............................ | 382/275 |
| 2006/0256231 | A1 * | 11/2006 | Sasaki et al. .................. | 348/373 |
| 2007/0229697 | A1 * | 10/2007 | Choi ............................... | 348/345 |
| 2008/0239064 | A1 * | 10/2008 | Iwasaki .......................... | 348/47 |
| 2008/0239107 | A1 * | 10/2008 | Cho ............................... | 348/241 |
| 2008/0266386 | A1 * | 10/2008 | Maeda ........................... | 348/47 |
| 2009/0179824 | A1 * | 7/2009 | Tsujimoto et al. .............. | 345/7 |
| 2009/0201384 | A1 * | 8/2009 | Kang et al. .................. | 348/222.1 |
| 2009/0324135 | A1 * | 12/2009 | Kondo et al. ................. | 382/284 |

FOREIGN PATENT DOCUMENTS

| | | |
|---|---|---|
| EP | 472015 B1 * | 12/1995 |
| JP | 1-93984 A | 4/1989 |
| JP | 6-133339 | 5/1994 |
| JP | 10-271534 A | 10/1998 |
| JP | 3117303 B2 | 12/2000 |
| JP | 2002-77947 A | 3/2002 |

OTHER PUBLICATIONS

Wikipedia Article on RAW image format. Published on Dec. 30, 2008.  http://web.archive.org/web/20081230013634/http://en.wikipedia.org/wiki/RAW_image_format.*
U.S. Appl. No. 13/353,537, filed Jan. 19, 2012, Ogasahara.
U.S. Appl. No. 12/023,825, filed Feb. 9, 2011, Hidaka.
Japanese Office Action issued Aug. 6, 2013 in Patent Application No. 2010-121758 with English Translation.
Japanese Office Action Issued May 14, 2013 in Patent Application No. 2010-121758 (with English translation).

* cited by examiner

*Primary Examiner* — Christopher S Kelley
*Assistant Examiner* — Ana Picon-Feliciano
(74) *Attorney, Agent, or Firm* — Oblon, McClelland, Maier & Neustadt, L.L.P.

(57) ABSTRACT

According to one embodiment, a camera module includes a first sub-camera module, a second sub-camera module, and an imaging circuit serving as a position correcting unit. The position correcting unit corrects a position of an image at a cross point of imaging lenses. The position correcting unit corrects the position of the image acquired through the image-capture by the second sub-camera module.

7 Claims, 9 Drawing Sheets

CAMERA MODULE AND IMAGE RECORDING METHOD

CROSS-REFERENCE TO RELATED APPLICATIONS

This application is based upon and claims the benefit of priority from the prior Japanese Patent Application No. 2010-121758, filed on May 27, 2010; the entire contents of all of which are incorporated herein by reference.

FIELD

Embodiments described herein relates generally to a camera module and an image recording method.

BACKGROUND

Conventionally, a photograph of a 3D stereovision image has been realized by using a camera module for a special 3D camera module or plural ordinary camera modules and the like. However, a 3D special camera module has a problem of increased development cost or production cost. In a method of using plural camera modules, variation in camera modules during the production greatly affects an image quality. Therefore, in order to acquire a high-definition 3D stereovision image by using plural camera modules, there arises a problem of reduction in a yield of the camera module, and significant increase in cost for suppressing variation during the production.

DETAILED DESCRIPTION

In general, according to one embodiment, a camera module includes a first sub-camera module, a second sub-camera module, and a position correcting unit. The first sub-camera module includes a first image sensor, and a first imaging optical system. The first imaging optical system takes light into the first image sensor. The second sub-camera module includes a second image sensor, and a second imaging optical system. The second imaging optical system takes light into the second image sensor. The position correcting unit corrects a position of an image at a cross point by the first imaging optical system and the second imaging optical system. When the first sub-camera module, of the first sub-camera module and the second sub-camera module, is defined as a reference, the position correcting unit corrects the position of the image captured by the second sub-camera module.

Exemplary embodiments of a camera module and an image recording method will be explained below in detail with reference to the accompanying drawings. The present invention is not limited to the following embodiments.

Figure 1:
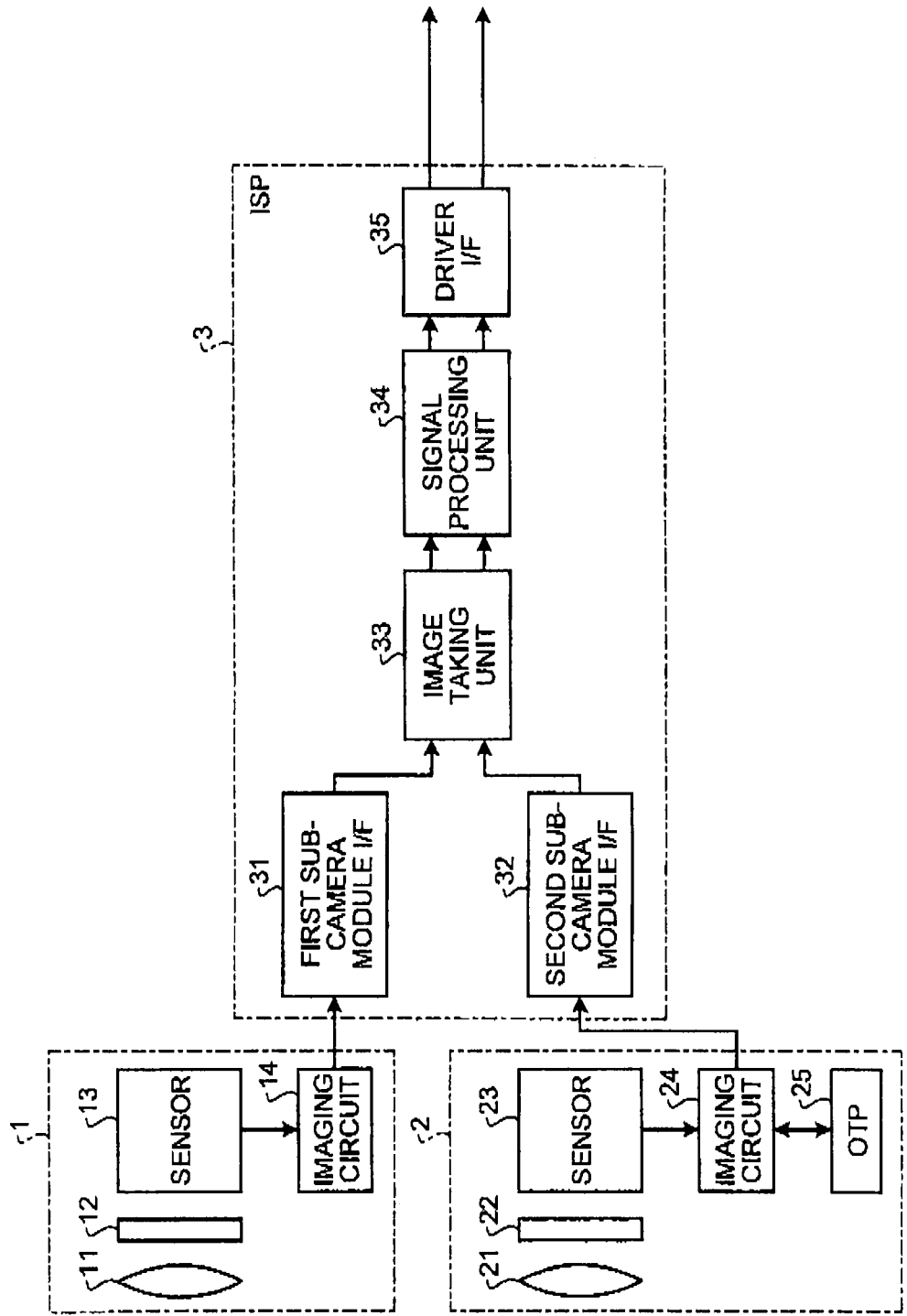
FIG. 1 is a block diagram illustrating a configuration of a camera module according to a first embodiment.

FIG. 1 is a block diagram illustrating a configuration of a camera module according to a first embodiment. A camera module includes a first sub-camera module 1, a second sub-camera module 2, and an ISP (image signal processor) 3.

The first sub-camera module 1 includes an imaging lens 11, an IR cut filter 12, a sensor 13, and an imaging circuit 14. The imaging lens 11 functions as the first imaging optical system that takes light from a subject into the sensor 13. The IR cut filter 12 removes infrared light from the light taken by the imaging lens 11. The sensor 13 functions as the first image sensor that converts the light taken by the imaging lens 11 into a signal charge.

The imaging circuit 14 takes sensitivity levels of red (R), green (G), and blue (B) in the order corresponding to a Bayer pattern so as to generate an analog image signal. The imaging circuit 14 also sequentially amplifies the analog image signal with a gain according to an imaging condition, and then, converts the obtained image signal into a digital form from an analog form.

The second sub-camera module 2 includes an imaging lens 21, an IR cut filter 22, a sensor 23, an imaging circuit 24, and an OTP (one time programmable memory) 25. The imaging lens 21 functions as the second imaging optical system that takes light from a subject into the sensor 23. The IR cut filter 22 removes infrared light from the light taken by the imaging lens 21. The sensor 23 functions as the second image sensor that converts the light taken by the imaging lens 21 into a signal charge.

The imaging circuit 24 takes sensitivity levels of R, G, and B in the order corresponding to a Bayer pattern so as to generate an analog image signal. The imaging circuit 24 also sequentially amplifies the analog image signal with a gain according to an imaging condition, and then, converts the obtained image signal into a digital form from an analog form. The OTP 25 stores a correction coefficient for a coordinate conversion of an image.

The ISP 3 includes a first sub-camera module I/F 31, a second sub-camera module I/F 32, an image taking unit 33, a signal processing unit 34, and a driver I/F 35. A RAW image captured by the first sub-camera module 1 is taken into the image taking unit 33 from the first sub-camera module I/F 31, A RAW image captured by the second sub-camera module 2 is taken into the image taking unit 33 from the second sub-camera module I/F 32.

The signal processing unit 34 performs a signal process to the RAW image taken into the image taking unit 33. The driver I/F 35 outputs the image signal, which has been subject to the signal process at the signal processing unit 34, to an unillustrated display driver. The display driver displays the image acquired by the first sub-camera module 1 and the image acquired by the second sub-camera module 2.

Figure 2:
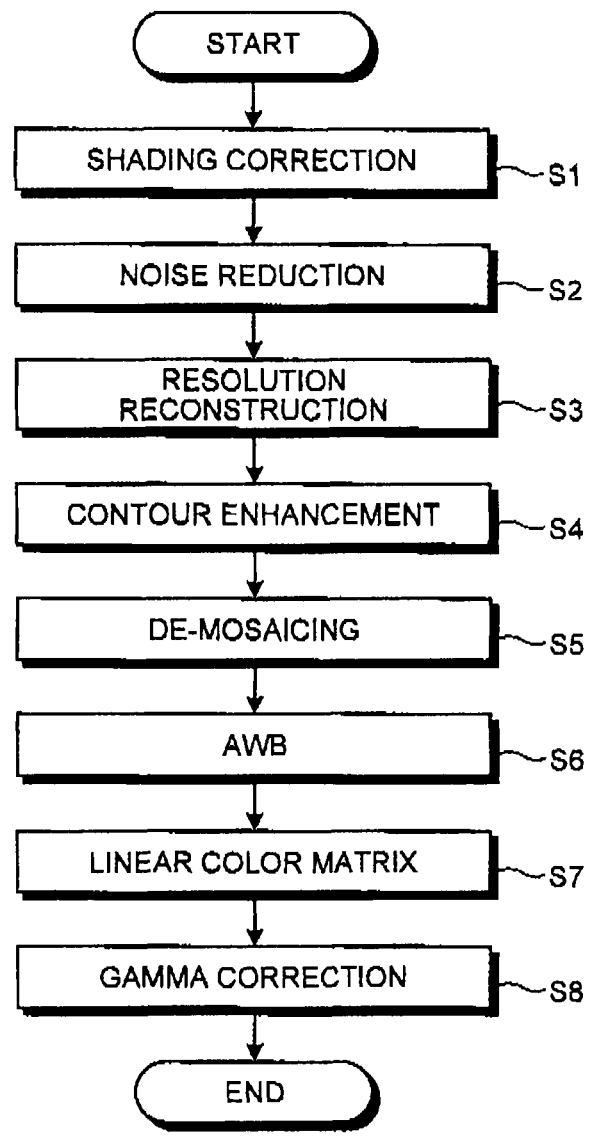
FIG. 2 is a flowchart for describing a procedure of a signal process by a signal processing unit.

FIG. 2 is a flowchart for describing a procedure of the signal process by the signal processing unit. The signal processing unit 34 performs a shading correction to the RAW image captured by the first sub-camera module 1 and the RAW image captured by the second sub-camera module 2, respectively (step S1). In the shading correction, a luminous unevenness due to a difference between a light quantity at the central part and the light quantity at the peripheral part caused by the imaging lenses 11 and 21 is corrected.

The signal processing unit 34 performs a noise reduction (step S2) for removing noises such as fixed-pattern noise, dark-current noise, or shot noise, a resolution reconstruction process (step S3), and an contour enhancement process (step S4). Then, the signal processing unit 34 performs a pixel interpolation process (de-mosaicing) to the digital image signal transmitted in the order of the Bayer pattern (step S5). In the de-mosaicing, a photosensitivity level of an insufficient color component by the interpolation process to the image signal obtained by the capture of the subject image is generated. The signal processing unit 34 synthesizes color images of the first sub-camera module 1 and the second sub-camera module 2 by the de-mosaicing.

The signal processing unit 34 performs an automatic white balance control (AWB) to the color image (step S6). The signal processing unit 34 also performs a linear color matrix process (step S7) for obtaining color reproduction, and a gamma correction (step S8) for correcting a color saturation or brightness of the image displayed on a display, etc. The procedure of the signal process described in the present embodiment is only illustrative, and the other processes may be added, skippable processes may be skipped, the order may be changed, and so on if necessary. The signal process by the respective components may be executed by the first sub-camera module 1 and the second sub-camera module 2, or the ISP 3, and the signal process may be shared.

Figure 3:
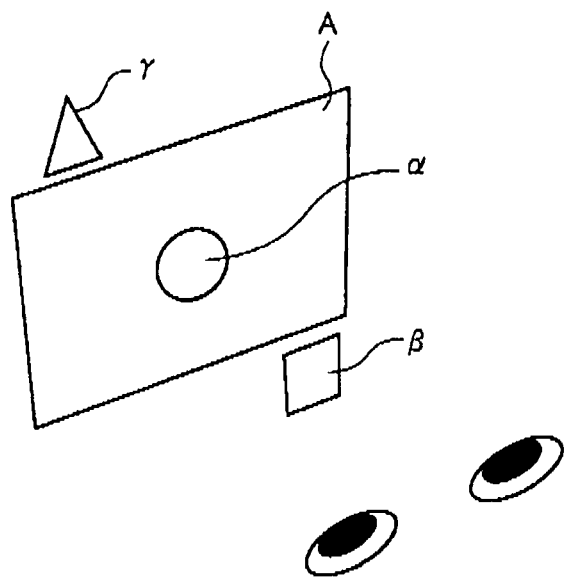
FIGS. 3 to 7 are explanatory views for realizing a 3D stereovision image.
Figure 4:
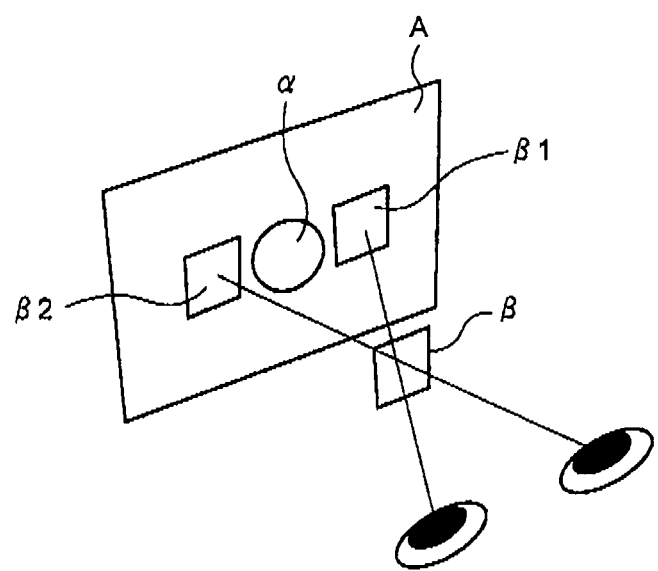

FIGS. 3 to 7 are explanatory views for realizing a 3D stereovision image. For example, it is supposed that a circle α in FIG. 3 is viewed on the same position on a surface A from both the left eye and the right eye of an observer. The circle α is on the position (cross point) where there is no parallax by left and right eyes. When it is supposed that a rectangle β is present in front of the circle α from the observer, an image β1 of the rectangle β is formed on the surface A on the gaze passing the rectangle β from the left eye, and an image β2 of the rectangle β is formed on the surface A on the gaze passing the rectangle β from the right eye, as illustrated in FIG. 4.

Figure 5:
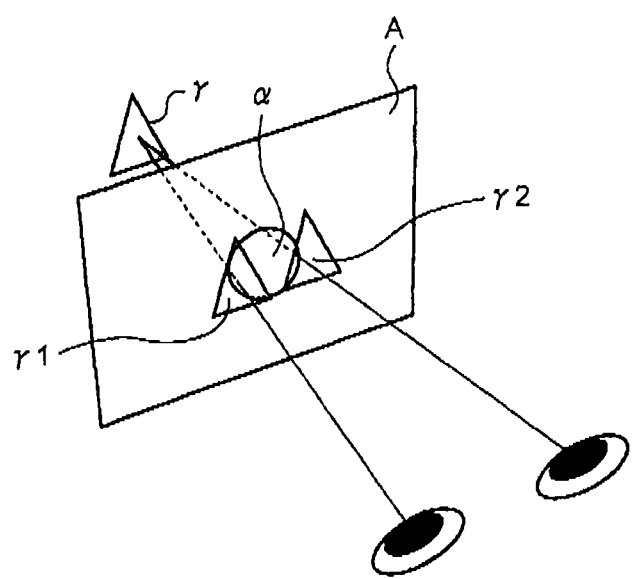
Figure 6:
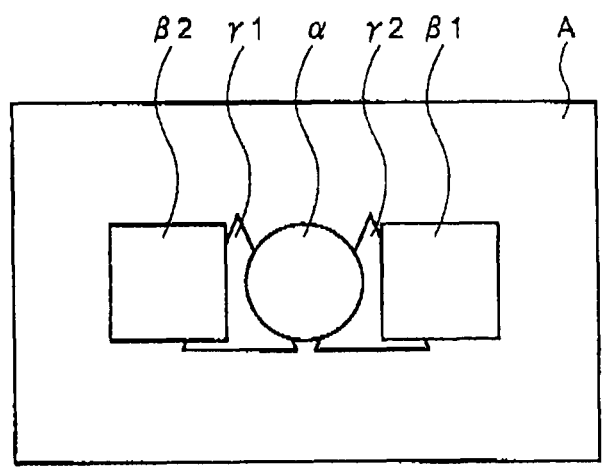

When it is supposed that a triangle γ is present at the back of the circle α from the observer, an image γ1 of the triangle γ is formed on the surface A on the gaze reaching the triangle γ from the left eye, and an image γ2 is formed on the surface A on the gaze reaching the triangle γ from the right eye, as illustrated in FIG. 5. When the respective images β1, β2, γ1, and γ2 are displayed together with the circle α on the surface A as illustrated in FIG. 6, a stereoscopic effect or a depth feel in which the rectangle β is present in front of the circle α, and the triangle γ is present at the back of the circle α can be obtained as illustrated in FIG. 3.

Figure 7:
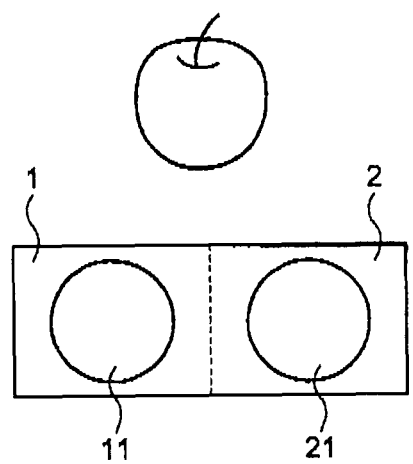

As is schematically illustrated in FIG. 7, the camera module captures an image for a right eye and an image for a left eye by the first sub-camera module 1 and the second sub-camera module 2, which are arranged side by side, in order to form a stereovision image. It is desirable that the camera module allows the image obtained from the first sub-camera module 1 and the image obtained from the second sub-camera module 2 to completely agree with each other at the cross point where there is no parallax by the imaging lens 11 and the imaging lens 21.

On the other hand, when there is a great deviation or distortion between the image for the left eye and the image for the right eye on the cross point due to the effect of the variation in the imaging lenses 11 and 21 during the manufacture or the mounting error of the first sub-camera module 1 and the second sub-camera module 2, etc., it is difficult for the camera module to obtain a high-definition 3D stereovision image. The camera module according to the present embodiment corrects the position of the image at the cross point by performing a coordinate conversion using a correction coefficient that is set beforehand.

Figure 8:
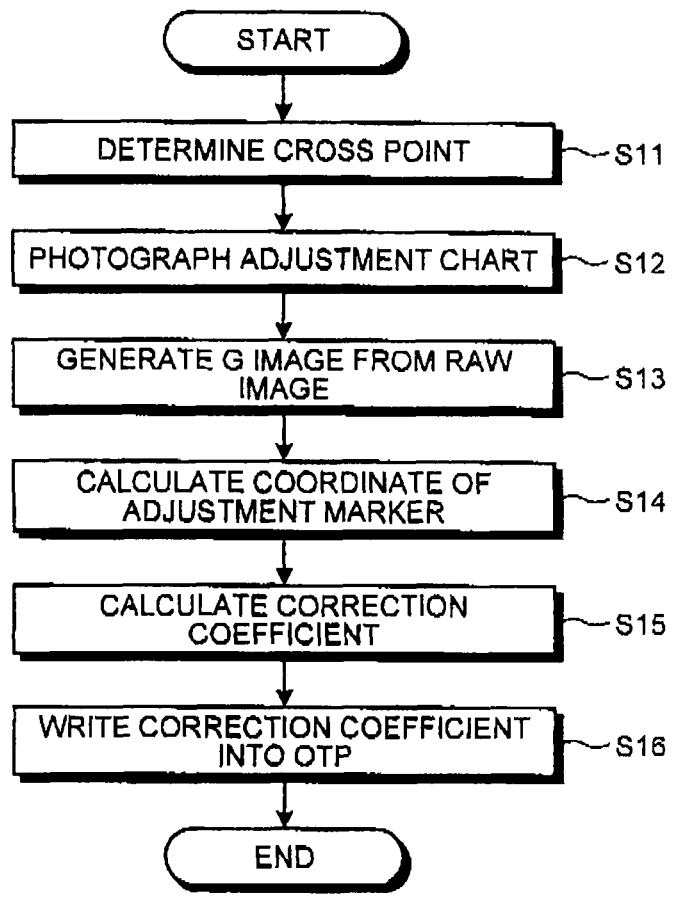
FIG. 8 is a flowchart for describing a procedure of setting a correction coefficient.

FIG. 8 is a flowchart for describing a procedure of setting the correction coefficient. The correction coefficient is set in the process after the first sub-camera module 1 and the second sub-camera module 2 are mounted during the production process of the camera module. In step S11, a distance to a subject for obtaining the cross point is determined. In step S12, an adjustment chart is arranged on the cross point determined in step S11, and the adjustment chart is photographed by the first sub-camera module 1 and the second sub-camera module 2.

Figure 9:
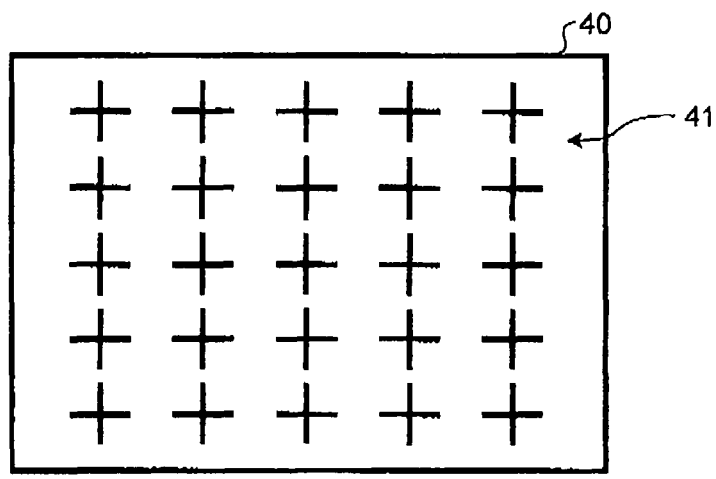
FIG. 9 is a view illustrating an example of an adjustment chart.

FIG. 9 is a view illustrating an example of the adjustment chart. The adjustment chart 40 has plural adjustment markers 41. Each of the adjustment markers 41 is a mark including two mutually-perpendicular straight lines, wherein the intersection of two lines is defined as a coordinate. The adjustment markers 41 are arranged in a matrix such that five markers are arranged in the longitudinal direction, and five markers are, for example, arranged in the lateral direction. It is desirable that 25 or more adjustment markers 41 are present, for example, but the number of the markers is not limited, so long as there are plural markers. Any adjustment markers 41 can be used, so long as they can specify the position on the adjustment chart 40. The shape of the adjustment markers 41 is not particularly limited. The arrangement of the adjustment markers 41 also may appropriately be changed. For example, when there is a range where a particularly high-definition photography is desired, many adjustment markers 41 may be arranged within this range.

In step S13, an image composed of a signal of G (hereinafter appropriately referred to as "G image") among R, G, and B is generated from the respective RAW images acquired from the first sub-camera module 1 and the second sub-camera module 2. As for a pixel for R and a pixel for B, the sensors 13 and 23 generate a signal value of G by interpolating the signal value of the peripheral G pixels. The G image is generated by using the signal value through the detection of the G pixel and the signal value through the interpolation process for the R pixel and the B pixel. When an image is photographed under low illumination, or when the sensitivity of the sensors 13 and 23 is low, the G image may be generated after the execution of noise reduction.

In step S14, the coordinates of the respective adjustment markers 41 are calculated from the G image generated in the step S13. In step S15, a correction coefficient is calculated from the coordinate of the adjustment marker 41 calculated in the step S14. The correction coefficient is calculated with the first sub-camera module 1, of the first sub-camera module 1 and the second sub-camera module 2, being set as a reference. In step S16, the correction coefficient calculated in the step S15 is written in the OTP 25 of the second sub-camera module 2. The correction coefficient may be written in the next ISP 3.

The correction coefficient is supposed to be a coefficient of a matrix operation. The correction coefficient is obtained from an equation described below by the least-square method, for example.

$$Y = kX$$

$$k = YX^t [XX^t]^{-1}$$

It is supposed that k is the correction coefficient, and Y and X are coordinates of the adjustment markers 41, wherein Y is the coordinate calculated from the image by the first sub-camera module 1, and X is the coordinate calculated from the image by the second sub-camera module 2. $X^t$ is defined as a transposed matrix of X. $[XX^t]^{-1}$ is defined as an inverse matrix of $XX^t$. The correction coefficient may be obtained by using other algorithm such as nonlinear optimization method, instead of the least-square method.

The imaging circuit 24 (see FIG. 1) of the second sub-camera module 2 reads the correction coefficient, which is set beforehand according to the above-mentioned procedure, from the OTP 25 when a subject is photographed by the camera module. The imaging circuit 24 performs the coordinate conversion using the correction coefficient, which is read from the OTP 25, to the RAW image obtained from the second sub-camera module 2. The imaging circuit 24 functions as the position correcting unit for correcting the position, at the cross point, of the image acquired by the second sub-camera module 2.

The imaging circuit 24 performs the coordinate conversion by the operation described below, for example.

$$\begin{bmatrix} x' \\ y' \\ 1 \end{bmatrix} = \begin{bmatrix} k_{11} & k_{12} & k_{13} \\ k_{21} & k_{22} & k_{23} \\ 0 & 0 & 1 \end{bmatrix} \cdot \begin{bmatrix} x \\ y \\ 1 \end{bmatrix}$$

Here, $k_{ij}$ is defined as the correction coefficient, (x, y) is defined as the coordinate before the correction, and (x', y') is defined as the coordinate after the correction. The camera module performs the coordinate conversion using the correction coefficient to the image obtained from the second sub-camera module 2, thereby allowing the image obtained by the first sub-camera module 1 and the image obtained by the second sub-camera module 2 to agree with each other at the cross point. Thus, the camera module can obtain a high-definition 3D stereovision image according to the present embodiment without performing a high-precise variation adjustment for the structure of plural sub-camera modules.

The image obtained by the second sub-camera module 2 may sometimes have uneven density in the resolution due to the coordinate conversion. The imaging circuit 24 may perform the interpolation process of the signal value of the peripheral pixel for the "coarse" portion, i.e., the portion where the pixel spacing is wide, caused by the coordinate conversion, thereby producing a new pixel, for example. With this process, a uniform and high-quality image can be obtained.

The correction correcting unit may perform a local coordinate conversion by the operation using the correction coefficient, which is appropriately changed according to the height of the image, instead of executing the coordinate conversion at one time by the matrix operation. The position correcting unit may perform the coordinate conversion by referring to a look-up table, for example, instead of the matrix operation.

It is not limited that the camera module generates the G image from the RAW image obtained by the capture by the sub-camera module in order to calculate the correction coefficient. The camera module may extract the G image from the images that have already been subject to the de-mosaicing at the signal processing unit 34 in order to calculate the correction coefficient, for example.

In the present embodiment, in the case of the camera module including sub-camera modules having the same resolution, an optional one of the plural sub-camera modules is defined as a reference, and the coordinate conversion is performed for the other sub-camera modules, whereby the adjustment for obtaining a high-definition stereovision image can be made.

The present embodiment is not limited to the camera module having sub-camera modules of the same resolution, but may be adapted to a camera module including sub-camera modules, each having a different resolution. In this case, an image of a sub-camera module having a great pixel number may be subject to scaling to reduce the pixel number according to the other sub-camera module, in order to perform the coordinate conversion similar to that in the present embodiment.

Since a moving image generally has lower resolution than that of a still image, it is considered that an image is subject to scaling to be used during the photograph of a moving image. In this case, the portion of the image corresponding to the center of the lens may be cropped (cut) to be used. Since the image at the portion corresponding to the center of the lens is used, the effect of distortion or shading due to the peripheral portion of the lens is reduced, whereby the image quality can be more enhanced.

For example, when a wafer level camera such as CSCM (chip scale camera module) is used, only cameras at both ends of a camera array, which is diced as an array of 3×1 or 4×1, for example, may be functioned as a sub-camera module. Even in this case, the photograph of 3D stereovision image is possible, and the production is easier compared to the case in which a wafer level camera, which is diced one by one, is further assembled.

Each of the first sub-camera module 1 and the second sub-camera module 2 illustrated in FIG. 1 may have the signal processing unit 34. It is desirable that the image taking unit 33 compares the output image of the first sub-camera module 1 and the output image of the second sub-camera module 2, and if there is a difference, the output image of the second sub-camera module 2 is corrected by a feedback circuit.

Figure 10:
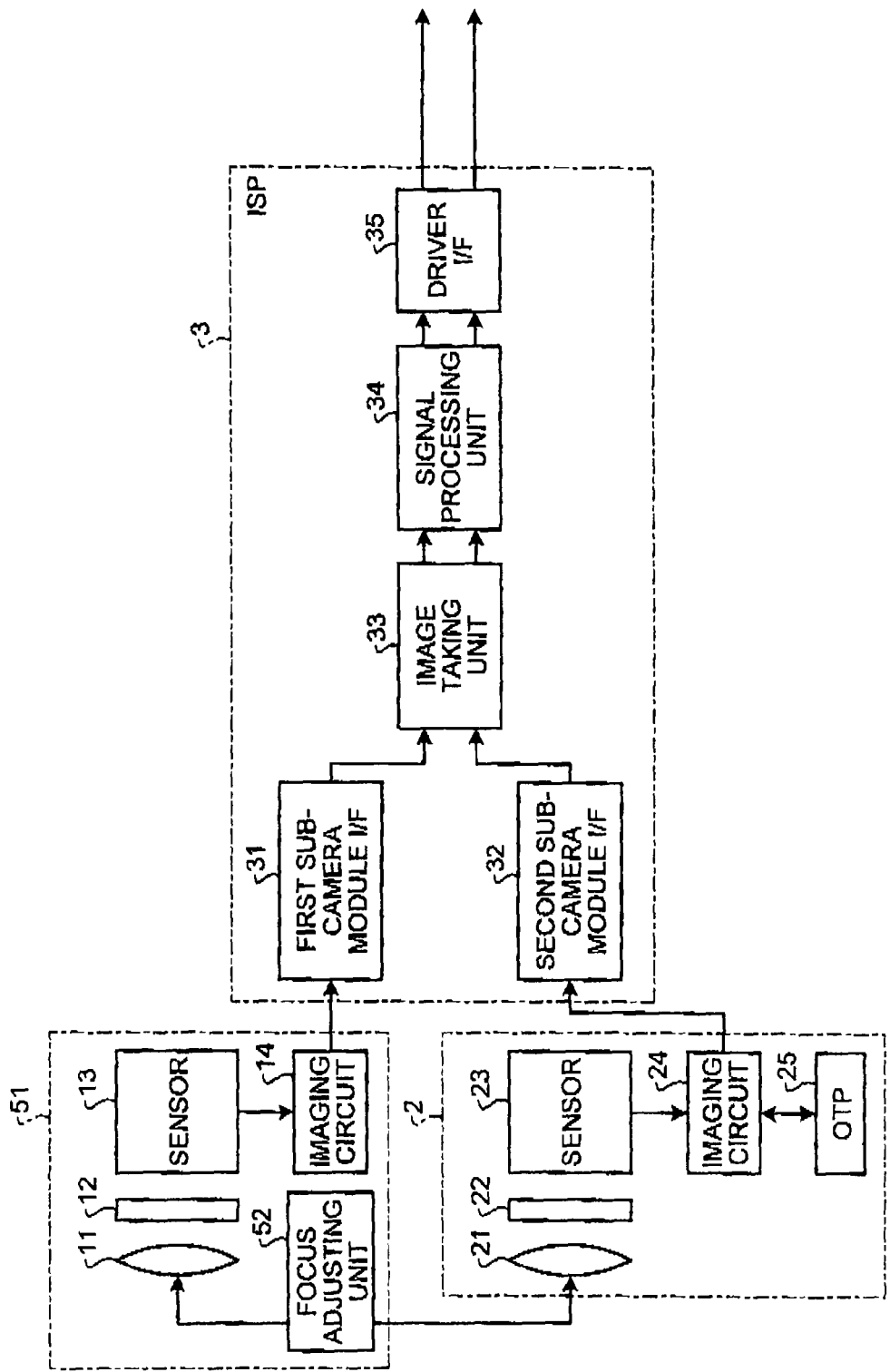
FIG. 10 is a block diagram illustrating a configuration of a camera module according to a second embodiment.

FIG. 10 is a block diagram illustrating a configuration of a camera module according to a second embodiment. The camera module according to the present embodiment has an auto-focus function. The camera module according to the present embodiment is characterized in that a lens extended amount for a focus adjustment is adjusted, thereby allowing the images of the respective sub-camera modules at the cross point to agree with one another. The components same as those in the first embodiment are identified by the same numerals, and the overlapping description will be skipped.

A first sub-camera module 51 includes an imaging lens 11, an IR cut filter 12, a sensor 13, an imaging circuit 14, and a focus adjusting unit 52. The focus adjusting unit 52 functions as a focus adjusting unit for adjusting the focus of the imaging lens 11 and the imaging lens 21. The camera module according to the present embodiment makes an adjustment by adding or subtracting an offset value, which is set beforehand according to the distance to the subject, to or from the lens extended amount of the imaging lens 21, thereby allowing the focal point of the imaging lens 21 to agree with the cross point.

Figure 11:
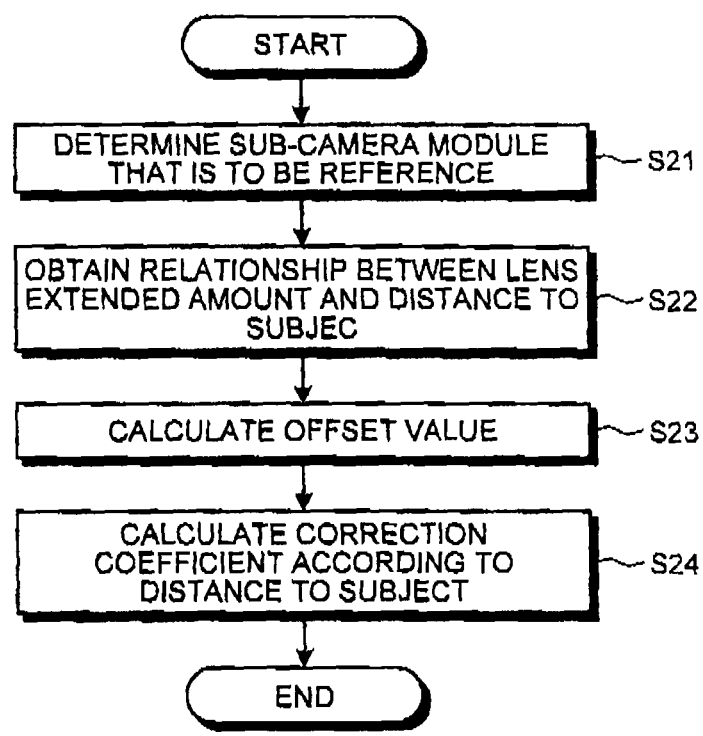
FIG. 11 is a flowchart illustrating a setting procedure in order to allow images of respective sub-camera modules to agree with one another at a cross point.

FIG. 11 is a flowchart illustrating a setting procedure in order to allow images of respective sub-camera modules to agree with one another at a cross point. The offset value and the correction coefficient are set in the process after the first sub-camera module 51 and the second sub-camera module 2 are mounted during the production process of the camera module.

In step S21, a sub-camera module that is to be defined as a reference is determined. The first sub-camera module 51 is set as a reference, of the first sub-camera module 51 and the second sub-camera module 2. In step S22, the relationship between the lens extended amount and the distance to a subject is obtained for the imaging lens 11 of the first sub-camera module 51 and the imaging lens 21 of the second sub-camera module 2.

Figure 12:
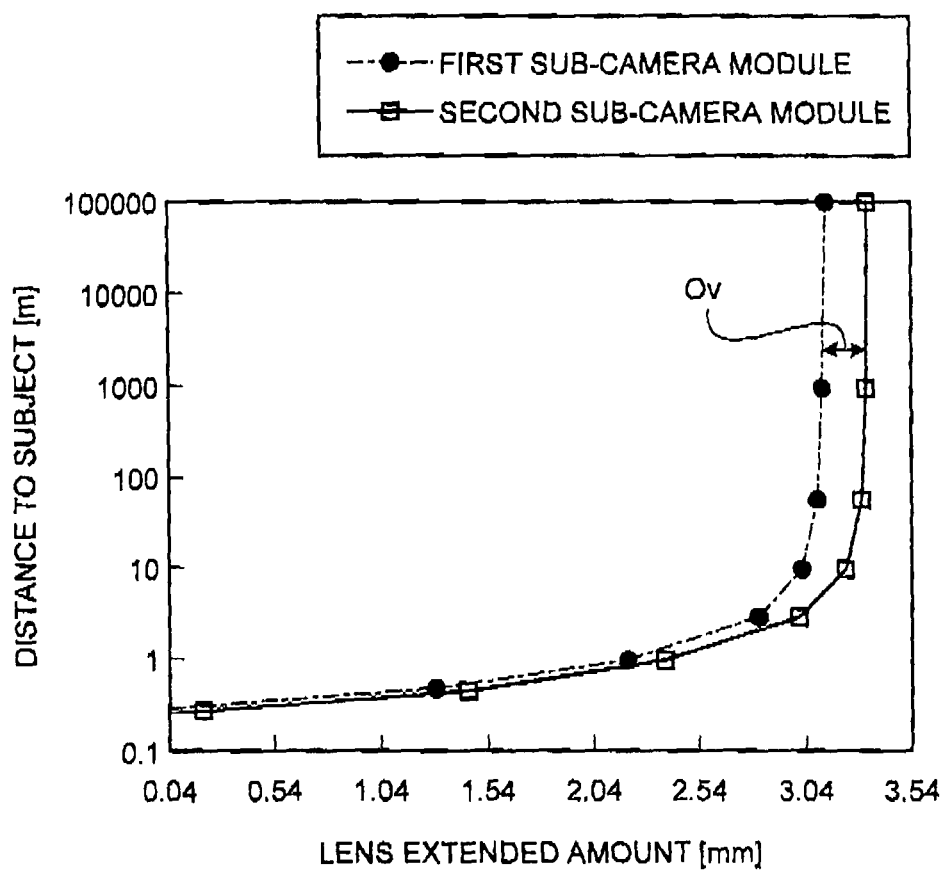
FIG. 12 is a view illustrating an example of a relationship between an extended amount of a lens and a distance to a subject.

FIG. 12 is a view illustrating an example of a relationship between the lens extended amount and the distance to a subject. The relationship between the lens extended amount and the distance to a subject is obtained such that a focus is adjusted for each of the first sub-camera module 51 and the second sub-camera module 2, every time the distance to a subject is made different, and the lens extended amounts at the respective distances to a subject are plotted. The relationship which is obtained beforehand through the photograph of the chart at the stage where the respective sub-camera modules are produced may be used as the relationship between the lens extended amount and the distance to a subject.

In step S23, an offset value Ov of the lens extended amount of the imaging lens 21 of the second sub-camera module 2 with respect to the lens extended amount of the imaging lens 11 of the first sub-camera module 51 is calculated. The offset value Ov is the difference between the extended amount of the imaging lens 11 and the extended amount of the imaging lens 21, and it is changed according to the distance to a subject, for example. The focus adjusting unit 52 holds the calculated offset value Ov.

In step S24, a correction coefficient according to the distance to a subject is calculated for the image acquired by the second sub-camera module 2. The correction coefficient is calculated with the distance to a subject being set to be 30 cm, 50 cm, 100 cm, 300 cm, and infinite, for example. The distance to a subject for calculating the correction coefficient can appropriately be set according to the performance of the imaging lenses 11 and 21. The OTP 25 holds the calculated correction coefficient. The correction coefficient may be held at the next ISP 3.

When the camera module photographs a subject, the focus adjusting unit 52 determines the lens extended amount for the focus adjustment to the first sub-camera module 51. The focus adjusting unit 52 adds or subtracts an offset value Ov, which is set beforehand to the lens extended amount for the first sub-camera module 51, to or from the second sub-camera module 2, thereby calculating the lens extended amount of the imaging lens 21. The focus adjusting unit 52 adjusts the extended amount of the imaging lens 21 of the second sub-camera module 2 according to the extended amount of the imaging lens 11 of the first sub-camera module 51, thereby allowing the focal point of the imaging lens 21 to agree with the cross point.

The camera module can uniquely determine the lens extended amount of the other sub-camera module with the determination of the lens extended amount of the sub-camera module that is defined as the reference. Since the individual focus adjustment for every sub-camera module is unnecessary, it is sufficient that the focus adjusting unit is provided only to the sub-camera module that is defined as the reference. Accordingly, a configuration is simplified, compared to the case in which the individual focus adjusting unit is provided to every sub-camera module, whereby the deviation of the focal points of the respective sub-camera modules can be suppressed.

The imaging circuit 24 of the second sub-camera module 2 performs the coordinate conversion, which uses the correction coefficient according to the distance to a subject, to the RAW image obtained by the second sub-camera module 2. When the distance to a subject during the photographing agrees with the distance to a subject during the calculation of the correction coefficient, the imaging circuit 24 uses the correction coefficient read from the OTP 25 as the coordinate conversion. When the distance to a subject during the photographing is different from the distance to a subject during the calculation of the correction coefficient, the imaging circuit 24 performs a linear interpolation to the correction coefficient read from the OTP 25 so as to calculate the correction coefficient corresponding to the distance to a subject during the photographing, for example. Then, the imaging circuit 24 uses the calculated correction coefficient for the coordinate conversion.

The camera module allows the focal points of the sub-camera modules to be agreed with each other, and allows the images to be agreed with each other at the cross point, through the adjustment of the lens extended amount by the first sub-camera module 51 and the second sub-camera module 2. Thus, the camera module can acquire a high-definition 3D stereovision image.

The focus adjusting unit employs the addition or subtraction of the offset value for the adjustment of the lens extended amount, and in addition to this, it may employ a numerical conversion by referring to a look-up table, etc., for example. It is desirable that the camera module allows the brightness of each image acquired by each sub-camera module to be agreed with each other by the shading correction at the signal processing unit 34, and allows a color tone to be agreed with each other by a linear color matrix process.

The present embodiment is not limited to the camera module having sub-camera modules of the same resolution, but may be adapted to a camera module including sub-camera modules, each having a different resolution. In this case, an image of a sub-camera module having a great pixel number may be subject to scaling to reduce the pixel number according to the other sub-camera module, in order to perform the coordinate conversion similar to that in the present embodiment.

The portion of the image, corresponding to the center of the lens, of the sub-camera module having a great pixel number may be cropped (cut). Since the image at the portion corresponding to the center of the lens is used, the effect of distortion or shading due to the peripheral portion of the lens is reduced, whereby the image quality can be more enhanced.

The first sub-camera module 51 and the second sub-camera module 2 illustrated in FIG. 10 may respectively have the signal processing unit 34. It is desirable that the image taking unit 33 compares the output image of the first sub-camera module 51 and the output image of the second sub-camera module 2, and if there is a difference, the output image of the second sub-camera module 2 is corrected by a feedback circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image recording method, comprising:
   determining a distance to a subject that is a cross point of a first sub-camera module and a second sub-camera module;
   imaging an adjustment chart arranged on the cross point by the first sub-camera module and the second sub-camera module;
   generating a green image composed from a RAW image of the adjustment chart acquired from the first sub-camera module;
   generating a green image composed from a RAW image of the adjustment chart acquired from the second sub-camera module;

calculating a correction coefficient used for a coordinate conversion of an image from the green image obtained from the second sub-camera module, wherein the green image acquired by the first sub-camera module is defined as a reference;

executing a focus adjustment of a first imaging optical system provided to the first sub-camera module and a second imaging optical system provided to the second sub-camera module; and performing the coordinate conversion, using the correction coefficient, to the image acquired by the second sub-camera module, wherein a lens extended amount of a second imaging optical system is uniquely determined with a determination of a lens extended amount of the first imaging optical system.

2. The image recording method according to claim 1, wherein the position of the image at the cross point is corrected by the coordinate conversion.

3. The image recording method according to claim 1, wherein the lens extended amount of the second imaging optical system is adjusted according to the lens extended amount of the first imaging optical system, so as to allow the focal point of the second imaging optical system to agree with the cross point, and the coordinate conversion using the correction coefficient according to the distance to a subject is executed.

4. The image recording method according to claim 3, wherein an offset value, set beforehand according to the distance to a subject, is added or subtracted to or from the lens extended amount of the second imaging optical system.

5. The image recording method according to claim 3, wherein the coordinate conversion, using the correction coefficient set beforehand for each of the distance to a subject, is performed to the image acquired by the second sub-camera module.

6. The image recording method according to claim 1, wherein an interpolation process of a signal value for each pixel is performed with respect to uneven density in resolution caused by the coordinate conversion.

7. The image recording method according to claim 1, wherein a part of at least one of images acquired by the first sub-camera module and the second sub-camera module is cropped to be used.

* * * * *